(12) United States Patent
Neitemeier et al.

(10) Patent No.: US 11,083,135 B2
(45) Date of Patent: Aug. 10, 2021

(54) COMBINE HARVESTER AND METHOD FOR THE OPERATION THEREOF

(71) Applicant: CLAAS Selbstfahrende Erntemaschinen GmbH, Harsewinkel (DE)

(72) Inventors: Dennis Neitemeier, Lippetal (DE); Frédéric Fischer, Arnsberg (DE); Daniel Sprigade, Unna (DE); Markus Brune, Harsewinkel (DE); Boris Kettelhoit, Guetersloh (DE); Andreas Arnold, Bielefeld (DE); Philipp Grossegesse, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 221 days.

(21) Appl. No.: 16/243,115

(22) Filed: Jan. 9, 2019

(65) Prior Publication Data
US 2019/0246561 A1    Aug. 15, 2019

(30) Foreign Application Priority Data
Feb. 15, 2018   (DE) .................. 102018103373.7

(51) Int. Cl.
*A01D 41/127*   (2006.01)
*A01D 61/02*    (2006.01)
*A01F 12/10*    (2006.01)

(52) U.S. Cl.
CPC ....... *A01D 41/1271* (2013.01); *A01D 41/127* (2013.01); *A01D 61/02* (2013.01); *A01F 12/10* (2013.01)

(58) Field of Classification Search
CPC ........ A01D 61/02; A01D 41/127–1273; A01F 12/10–16; A01F 12/46
See application file for complete search history.

(56) References Cited

U.S. PATENT DOCUMENTS 3,073,099 A * 1/1963 Andersen ........... A01D 41/1274
                                                      460/6
4,360,998 A * 11/1982 Somes ............... A01D 41/1271
                                                      460/5
(Continued)

FOREIGN PATENT DOCUMENTS

DE           4311054 A1     10/1994
DE       102012223432 B3     3/2014
(Continued)

OTHER PUBLICATIONS

European Search Report dated June 17, 2019 Issued in EP18207939 (with English translation of relevant parts).

*Primary Examiner* — Thomas B Will
*Assistant Examiner* — Joan D Misa
(74) *Attorney, Agent, or Firm* — Collard & Roe, P.C.

(57) ABSTRACT

A combine harvester has at least one header for cutting plants to be harvested with the aid of the combine harvester, a feeder for conveying the cut plants in the direction of a threshing mechanism, and a threshing mechanism, with the aid of which fruits can be removed from the cut plants in such a way that the fruits are then present separately from plant residue of the plants. The feeder comprises a revolvingly driveable conveying unit and a conveyor channel within which the cut plants can be conveyed with the conveying unit. The feeder interacts with a measuring unit in the form of a sensor unit that contactlessly detects material feed height of plants conveyed with the aid of the feeder in the conveyor channel.

8 Claims, 4 Drawing Sheets

(56) References Cited

U.S. PATENT DOCUMENTS

| | | | | |
|---|---|---|---|---|
| 5,524,424 | A * | 6/1996 | Halgrimson | A01D 41/127 56/10.2 A |
| 5,855,108 | A * | 1/1999 | Salz | A01D 41/1274 56/10.2 G |
| 5,920,018 | A * | 7/1999 | Wilkerson | G01F 1/74 73/861.41 |
| 6,213,870 | B1 | 4/2001 | Satzler | |
| 6,318,153 | B1 * | 11/2001 | Dumberger | A61B 8/546 73/159 |
| 6,407,858 | B1 * | 6/2002 | Montagu | B01L 3/0244 250/201.3 |
| 6,475,081 | B2 * | 11/2002 | Goers | A01D 41/127 460/6 |
| 6,553,300 | B2 * | 4/2003 | Ma | A01D 41/127 382/156 |
| 6,584,390 | B2 * | 6/2003 | Beck | A01D 41/127 172/4.5 |
| 6,584,755 | B2 * | 7/2003 | Holtkotte | A01D 43/085 56/10.2 B |
| 6,951,514 | B1 | 10/2005 | Coers et al. | |
| 7,001,267 | B2 * | 2/2006 | Behnke | A01D 41/127 460/6 |
| 8,347,709 | B2 * | 1/2013 | Kormann | G01F 13/003 73/272 R |
| 8,954,224 | B2 * | 2/2015 | Behnke | A01D 41/1277 701/33.4 |
| 9,089,092 | B2 * | 7/2015 | Diekhans | A01D 43/085 |
| 9,301,446 | B2 * | 4/2016 | Peters | A01D 41/127 |
| 9,795,082 | B2 * | 10/2017 | Middelberg | A01F 12/18 |
| 10,694,670 | B2 * | 6/2020 | Gresch | A01B 69/001 |
| 2002/0014116 | A1 * | 2/2002 | Campbell | G01F 23/296 73/149 |
| 2004/0054457 | A1 * | 3/2004 | Kormann | G07C 5/085 701/50 |
| 2015/0245560 | A1 * | 9/2015 | Middelberg | A01F 12/18 460/7 |
| 2015/0305238 | A1 * | 10/2015 | Klausmann | A01D 41/127 701/50 |
| 2020/0008350 | A1 * | 1/2020 | Borsdorf | A01D 61/00 |

FOREIGN PATENT DOCUMENTS

| | | |
|---|---|---|
| EP | 1266558 A2 | 12/2002 |
| EP | 2218320 A2 | 8/2010 |

* cited by examiner

COMBINE HARVESTER AND METHOD FOR THE OPERATION THEREOF

CROSS-REFERENCE TO RELATED APPLICATIONS

This application claims priority under 35 USC 119 of German Application No. 102018103373.7, filed on Feb. 15, 2018, the disclosure which is herein incorporated by reference.

BACKGROUND OF THE INVENTION

The present application relates to a combine harvester and to a method for operating a combine harvester.

Such a combine harvester includes, in particular, a header, a feeder, as well as further working elements downstream from the feeder. These include, in particular, at least one threshing mechanism, with the aid of which fruits of cut plants can be removed from the plants, and so the fruits are henceforth present separately from plant residue of the plants. The mixture of detached fruits and plant residue is then typically fed to a separation mechanism, with the aid of which fruits, for example, grains, can be separated from the plant residue. The plant residue is finally discharged on a rear side of the combine harvester, while the fruits are stored in a tank provided therefor.

The feeder of such a combine harvester has the task of conveying the plants, which have been cut close to the ground, in the direction of the threshing mechanism. In doing so, the feeder generally has not only the pure conveying function, but also a bundling function, since a width of the header generally considerably exceeds a width of a conveyor channel of the feeder. As a result, the cut plants, after having been cut, are brought together in a direction transversely to the direction of travel of the combine harvester and are fed to the conveyor channel. A feeder typically comprises at least one conveying unit which, in turn, comprises at least two oppositely positioned rollers and at least one endless belt wrapped around the rollers. The conveying unit generally includes a plurality of such rollers as well as a plurality of endless belts interacting with the rollers. The endless belts can interact, for example, with a plurality of conveyor slats or impact bars extending transversely to a feed direction of the feeder, the conveyor slats or impact bars being ultimately suitable for engaging into the cut plants and, in this way, conveying the cut plants along the conveyor channel obliquely upward in the direction of the threshing mechanism.

With respect to an efficient operation of a combine harvester, it is of particular interest to achieve a preferably high throughput of crop in the form of cut plants. A maximum throughput is limited only by the capability of the combine harvester to further process the plants fed to the threshing unit. In this case, it is of interest, in particular, to hold a loss of fruits, in particular grains, to a lowest possible level. Correspondingly, it is already known from the related art to measure a throughput quantity of cut plants in the area of the feeder and, in this way, for example, to adjust a ground speed of the combine harvester. Reference is made, in this regard, to the German patent document DE 43 11 054 C2, by way of example. In the aforementioned document, a so-called material feed height roller is utilized as a measuring unit for detecting a material feed height within the conveyor channel. This is a mechanical component in this case, which is deflected depending on the material feed height of the cut plants within the conveyor channel, wherein an inference about the material feed height is drawn depending on the aforementioned deflection.

The known device has the particular disadvantage, however, that a measuring range which can be depicted with the aid of the device is limited in the downward direction and in the upward direction. This is due to mechanical stops of the measuring unit or the material feed height roller. This can have the result, in particular, that a precise conclusion regarding the mass flow of cut plants, which is fed to the threshing mechanism with the aid of the feeder, is not possible within the generally most efficient operating range of the combine harvester, since, in the aforementioned operating range, the material feed height of the cut plants is typically so high that the material feed height roller is already located at its upper stop.

SUMMARY OF THE INVENTION

It is therefore an object of the invention to provide a combine harvester, with the aid of which information regarding the material feed height of the cut plants within the conveyor channel of the feeder can be more reliably obtained.

The underlying problem is solved according to the invention with the aid of a combine harvester comprising at least one header for cutting plants to be harvested with the aid of the harvesting machine, at least one feeder for conveying the cut plants in the direction of a threshing mechanism, and at least one threshing mechanism, with the aid of which fruits can be removed from the cut plants so that the fruits are then present separately from plant residue of the plants. The feeder comprises at least one revolvingly driveable conveying unit which, together with at least one channel wall of the feeder, delimits a conveyor channel, within which the cut plants can be conveyed with the aid of the conveying unit. The feeder interacts with a measuring unit that allows for the detection of a material feed height, which is present within the conveyor channel, of plants conveyed with the aid of the feeder. The measuring unit comprises at least one sensor unit for contactlessly detecting the material feed height.

The combine harvester according to the invention comprises a measuring unit which, in turn, includes at least one sensor unit. The sensor unit is designed in such a way that it is suitable for contactlessly detecting the material feed height of the cut plants within the conveyor channel. In particular, the sensor unit can comprise at least one sensor element which is designed as an inductive sensor element.

The combine harvester according to the invention has several advantages. In particular, the determination of the material feed height of the cut plants can take place independently of mechanical limitations of the measuring unit due to the fact that the measurement is carried out with the aid of the contactlessly operating sensor unit. In this way, the range of detectable material feed heights within the conveyor channel is not limited in the upward direction or in the downward direction. This, in turn, has the result that information regarding the mass flow of cut plants can be more reliably gathered and, finally, the associated combine harvester can be more precisely regulated.

Apart from the pure absolute throughput quantity of the plants, the manner in which these plants are distributed within the conveyor channel, i.e., across a width of the conveyor channel, in the feeder has also proven to be relevant. Therefore, it has been proven to be disadvantageous when a particularly high density of the cut plants is present, for example, at the edges of the conveyor channel, while only small quantities of the plants are conveyed in a middle area of the conveyor channel. In addition to an asymmetrical supply of the threshing mechanism downstream from the feeder, this non-uniform transverse distribution of the plants has the result, in particular, that, following the threshing mechanism, a downstream separation mechanism is also non-uniformly supplied. This is disadvantageous with respect to a preferably complete separation of the fruits, which have been removed with the aid of the threshing mechanism, from the plant residue, since the aforementioned separation cannot be carried out as reliably for a comparatively thick layer on a sieve of the separation mechanism as for a relatively thinner layer. In other words, a loss of removed fruits is that much greater, the more concentrated the mixture of fruits and plant residue originating from the threshing mechanism is on the separation mechanism which, for example, can be designed in the form of a tray-type shaker. Correspondingly, it has proven to be a worthwhile goal to supply the threshing mechanism, in the first instance, and the particular separation mechanism, in the second instance, in particular, with plants in the most uniform manner possible, in order to be able to effectuate a preferably efficient separation of the removed fruits from the plant residue.

In light of this situation, it has proven to be particularly advantageous when the sensor unit comprises multiple sensor elements distributed across a width of the conveyor channel, with the aid of which the material feed height of the cut plants within the conveyor channel can be contactly detected in each case. Advantageously, at least one of these sensor elements is designed in the form of an inductive sensor element, wherein, further preferably, all of the utilized sensor elements are designed as inductive sensor elements. The use of multiple sensor elements which are distributed across the width of the conveyor channel makes it possible to gather information regarding the material feed height of the plants at different points within the conveyor channel. On the basis thereof, at least approximately one piece of information regarding a transverse distribution of the cut plants within the conveyor channel can be gathered. This information can then be processed, for example, in order to affect the particular working elements downstream from the feeder, i.e., in particular, a threshing mechanism and/or a separation mechanism, in such a way that the fruits of the plants are obtained as efficiently as possible.

In this connection, it has also been proven to be particularly advantageous when the combine harvester comprises at least one evaluation unit which is connected to the sensor unit in a data-transmitting manner, for example, with the aid of a cable connection or with the aid of a wireless radio link. The evaluation unit is suitable for evaluating information from the individual sensor elements in such a way that at least approximately one piece of information regarding the transverse distribution of the cut plants within the conveyor channel results. The aforementioned piece of information relates, in this case, at least to a transverse distribution across a portion of the width of the conveyor channel, preferably, however, a transverse distribution across the entire width of the conveyor channel.

In order to ascertain the material feed height of the cut plants across the width of the conveyor channel in the most meaningful manner possible and, in this way, to be able to draw a conclusion regarding the transverse distribution of the cut plants, it is also particularly advantageous when the sensor unit comprises at least two sensor elements which are distributed across the width of the conveyor channel, preferably equidistantly.

With respect to the configuration of the sensor elements, it can be particularly advantageous in this case to utilize at least one elongated sensor strip, the longitudinal axis of which preferably extends transversely to a feed direction of the feeder. With the aid of such a sensor strip, it is possible to gather information regarding the material feed height of the cut plants not only in a punctiform manner at one certain point within the conveyor channel, but rather across a length of the sensor strip. In this way, the information regarding the transverse distribution across the width of the conveyor channel can be ascertained particularly well.

Regardless of the number of utilized sensor elements, it is also advantageous when the sensor unit is situated outside the conveyor channel. In particular, it is conceivable to situate the sensor unit below a channel base of the conveyor channel. This arrangement of the sensor unit has the advantage, first of all, that preferably few installed elements are located within the conveyor channel, which could disturb the flow of the cut plants through the conveyor channel. Moreover, the required installation space within the conveyor channel can be reduced, since, in contrast to the related art, the arrangement of a measuring unit within the conveyor channel is no longer required. An arrangement of at least one sensor element on one or both of the oppositely positioned side walls of the feeder is also conceivable, which is helpful, in particular, with respect to a reliable detection of edge areas of the conveyor channel.

With respect to the method, the underlying problem is solved according to the invention with the aid of a method A method for operating a combine harvester including the following method steps:
    cutting plants to be harvested are cut with the aid of a header;
    conveying the cut plants in the direction of a threshing mechanism with the aid of a feeder,
    detecting a material feed height of the plants conveyed through the conveyor channel with the aid of a measuring unit in the form of a sensor unit that contactlessly detects the material feed height of the plants, and
    removing fruits from the cut plants with the aid of the threshing mechanism, and so the fruits are then present separately from plant residue of the plants.

The method according to the invention provides that the material feed height of the plants within the conveyor channel of the feeder is contactlessly detected. This method is particularly easily implemented with the aid of the combine harvester according to the invention. The resultant advantages have already been described above. In particular, the contactless detection of the material feed height is not dependent on a certain mechanical range, outside of which no further information regarding the material feed height can be gathered. In the end, a conclusion regarding the material feed height of the cut plants within the feeder can therefore be reliably continuously drawn, regardless of a particular operating situation.

In one advantageous embodiment of the method according to the invention, the material feed height is measured at different measurement points distributed across a width of the conveyor channel. This offers the advantage that, in addition to a pure conclusion regarding the material feed height at a certain point within the conveyor channel, at least approximately one conclusion regarding a transverse distribution of the cut plants across a width of the conveyor channel can be drawn. As described above, such a piece of information regarding the transverse distribution can also be utilized for affecting the operation of the particular combine harvester in a positive way, in particular with regard to its efficiency.

Advantageously, the material feed height of the cut plants is measured exclusively contactlessly, i.e., without the use of mechanical sensors. In this way, in particular, the conveyor channel can be kept free from sensor elements which could otherwise disturb a flow of the cut plants within the conveyor channel and would also take up installation space.

Moreover, it can be of particular advantage when information gathered with the aid of the sensor unit is evaluated with the aid of an evaluation unit, and so a piece of information regarding a tranverse distribution of the cut plants within the conveyor channel results. The aforemention piece of information relates, at least, to a portion of a width of the conveyor channel, preferably, however, the entire width of the conveyor channel.

With further respect to the method according to the invention, this piece of information regarding the transverse distribution is forwarded to downstream working elements of the combine harvester, and so these working elements can be adjusted with respect to the transverse distribution. In particular, it is conceivable to change at least one operating parameter of at least one working element downstream from the feeder depending on the transverse distribution of the cut plants within the conveyor channel.

BRIEF DESCRIPTION OF THE DRAWINGS

The combine harvester according to the invention as well as the method according to the invention are explained in greater detail in the following with reference to an exemplary embodiment which is represented in the figures. In the drawings.

DETAILED DESCRIPTION OF THE EMBODIMENTS

One exemplary embodiment, which is represented in FIGS. 1 to 4, comprises a combine harvester 1 according to the invention, which is equipped at a front end with a header 2. With the aid of this header 2, the combine harvester 1 is capable of cutting plants 4 and then conveying the plants with the aid of a feeder 3 in the direction of a threshing mechanism 5. A resultant feed direction 17 is graphically illustrated in FIG. 1 with the aid of an arrow. The plants 4 are barley in this case. The cut plants 4 are then threshed with the aid of the threshing mechanism 5, and so fruits from the plants 4 are removed and are subsequently present separately from the plant residue. One portion of the removed fruits is separated out directly in the area of the threshing mechanism 5 with the aid of a threshing concave 19 lying underneath, while the plant residue, together with fruits mixed therein, is forwarded in the direction of a separation mechanism 20 downstream from the threshing mechanism 5. The aforementioned separation mechanism 20 is formed by a tray-type shaker in this case, with the aid of which the remaining fruits are separated from the plant residue and are directed onto a return pan 13. The remaining plant residue is finally discharged at a rear end of the combine harvester 1.

Figure 2:
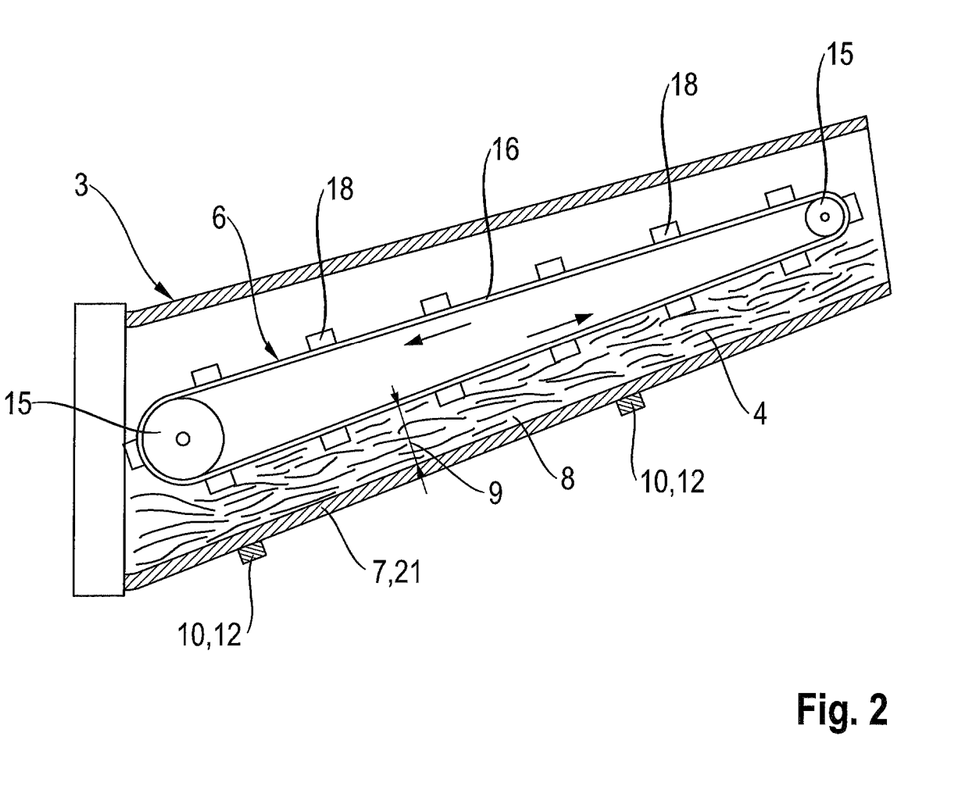
FIG. 2 shows a longitudinal section of a feeder of the combine harvester represented in FIG. 1.
Figure 3:
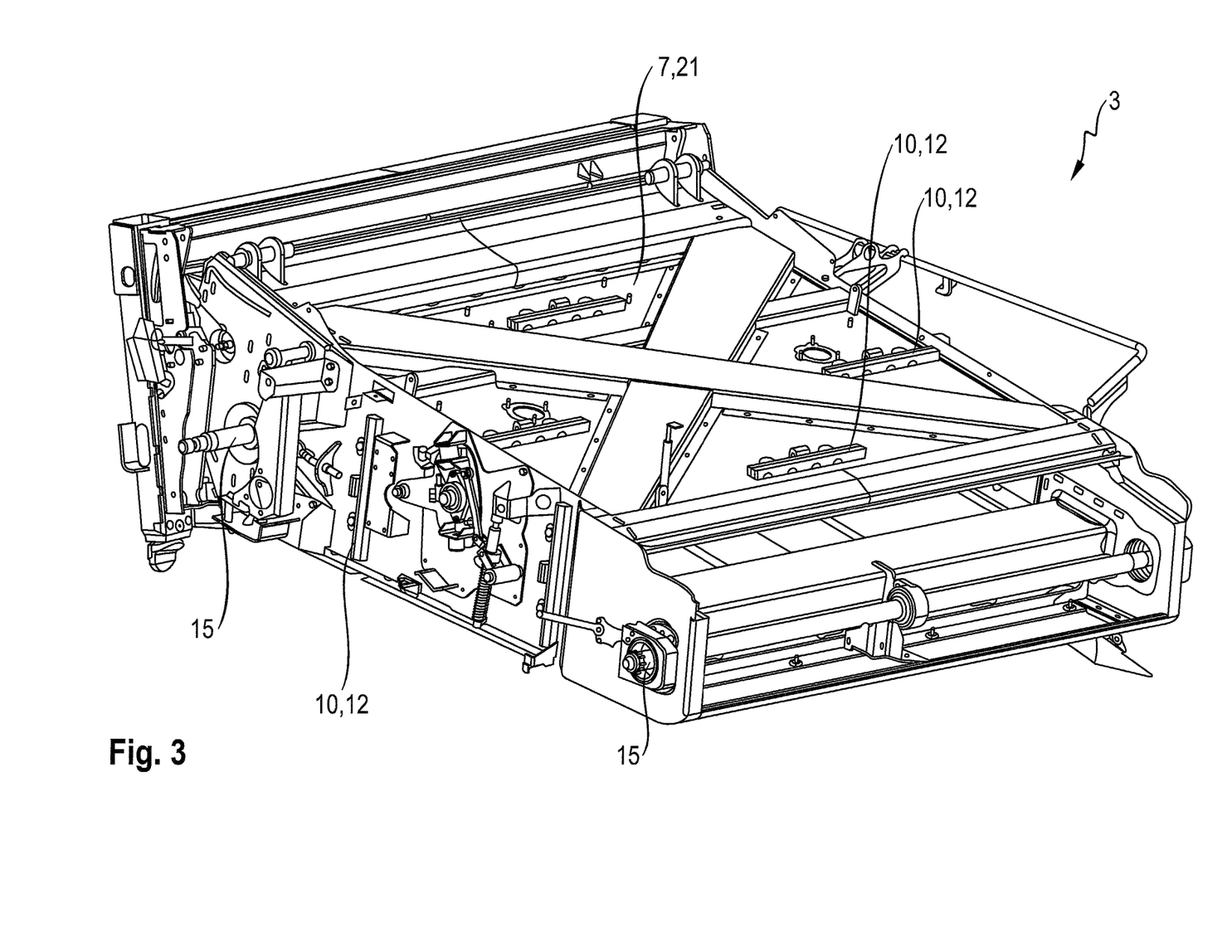
FIG. 3 shows an isometric view of the feeder according to FIG. 2 as viewed from an underside.

The feeder 3 comprises a conveying unit 6 which, in turn, comprises oppositely positioned rollers 15 and a plurality of endless belts 16 wrapped around these rollers 15. Conveyor slats 18 extend between the endless belts 16 which are distributed along a width 11 of the feeder 3. These conveyor slats 18, which are also referred to as impact bars, are utilized for engaging with the cut plants 4 in a form-locking manner and thereby conveying the cut plants 4 upward, against the force of gravity, in the direction of the threshing mechanism 5. Overall, the conveying unit 6, together with three channel walls 7, delimits a conveyor channel 8, within which the cut plants 4 are conveyed. The channel walls 7 are formed, in this case, in particular, by a channel base 21 and two opposite side walls 22 situated perpendicularly to the channel base 21. The distance between these side walls 22 of the conveyor channel 8 essentially corresponds to the width 11 of the feeder 3 or the conveyor channel 8.

Moreover, the combine harvester 1 according to the invention comprises a measuring unit which, according to the invention, is in the form of a sensor unit 10 in this case. This sensor unit 10 interacts with the feeder 3 in such a way that it is suitable for detecting a material feed height 9 of plants 4 conveyed with the aid of the feeder 3 within the conveyor channel 8. In the example shown, the sensor unit 10 comprises a total of four sensor elements 12 in the form of inductive sensor elements 12 in each case. These sensor elements 12 are situated outside the conveyor channel 8 in this case, wherein the sensor elements 12 are situated below the channel base 21. An alternative or additional arrangement of sensor elements 12 on one or both side walls 22 is also conceivable. Due to the embodiment of the sensor elements 12 as inductive sensor elements 12, it is possible to contactlessly detect the material feed height 9 of the cut plants 4. In this way, it is not necessary, in particular, to situate a mechanical sensor element within the conveyor channel 8, which enters into direct engagement with the cut plants 4. The advantages resulting from the utilization of contactlessly operating sensor elements 12 have already been explained above. In the example shown, the conveyor channel 8 is non-uniformly filled with cut plants 4. This is illustrated in FIG. 3, wherein the conveyor channel 8 is comparatively highly filled in its two opposite edge areas directly abutting the side walls 22, i.e., the material feed height 9 of the plants at least essentially corresponds to an overall available height of the conveyor channel 8, while the conveyor channel 8 has a considerably lower material feed height 9 in a middle area, which corresponds to approximately one half of the material feed height 9 in the edge areas in the example shown.

Figure 4:
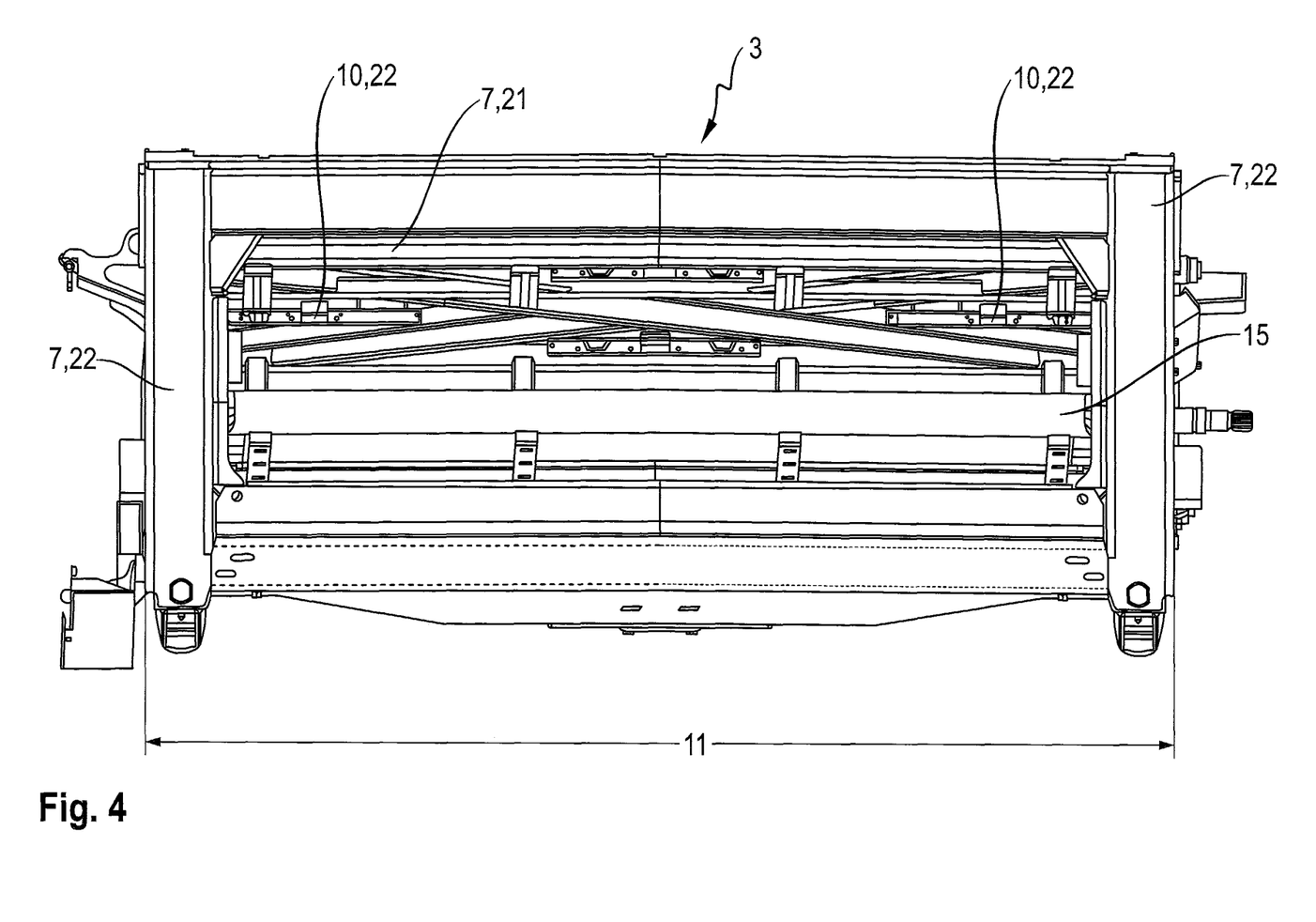
FIG. 4 shows a front view of the feeder according to FIG. 2.

In the example shown, the sensor elements 12 are designed in the form of elongated sensor strips which are distributed across the width 11 of the conveyor channel 8, wherein a distribution of the sensor elements 12 deviating therefrom is also conceivable, of course. Therefore, the sensor unit 10 is suitable for detecting the material feed height 9 at different points within the conveyor channel 8. On the basis of the pieces of information gathered at individual points of the conveyor channel 8 regarding the material feed height 8 of the cut plants 4, a piece of information regarding a transverse distribution of the cut plants 4 within the conveyor channel 8 can then be generated with the aid of an evaluation unit 14 which is connected in a data-transmitting manner to the sensor unit 10. In particular, it is conceivable to linearly or quadratically interpolate between the discrete measured values of the sensor elements 12 and, in this way, in the end, to be able to draw a conclusion regarding the transverse distribution. The connection between the evaluation unit 14 and the sensor unit 10 takes place wirelessly in the example shown. A wired transmission is also conceivable. As an alternative to elongated sensor elements 12, it is also conceivable to utilize at least one, preferably multiple punctiform sensor elements.

The elongated sensor element 12 is advantageously oriented with its longitudinal axis obliquely with respect to a feed direction 17 of the feeder 3, and so it extends across a portion of the width 11 of the conveyor channel 8. As compared to punctiform sensor elements, elongated sensor elements 12 open up the possibility of obtaining information regarding the material feed height 9 with high resolution across a comparatively short distance. This results in the advantage that, on the basis of such information, a higher-quality piece of information regarding the transverse distribution of the cut plants 4 can be ascertained with the aid of the evaluation unit 14.

Figure 1:
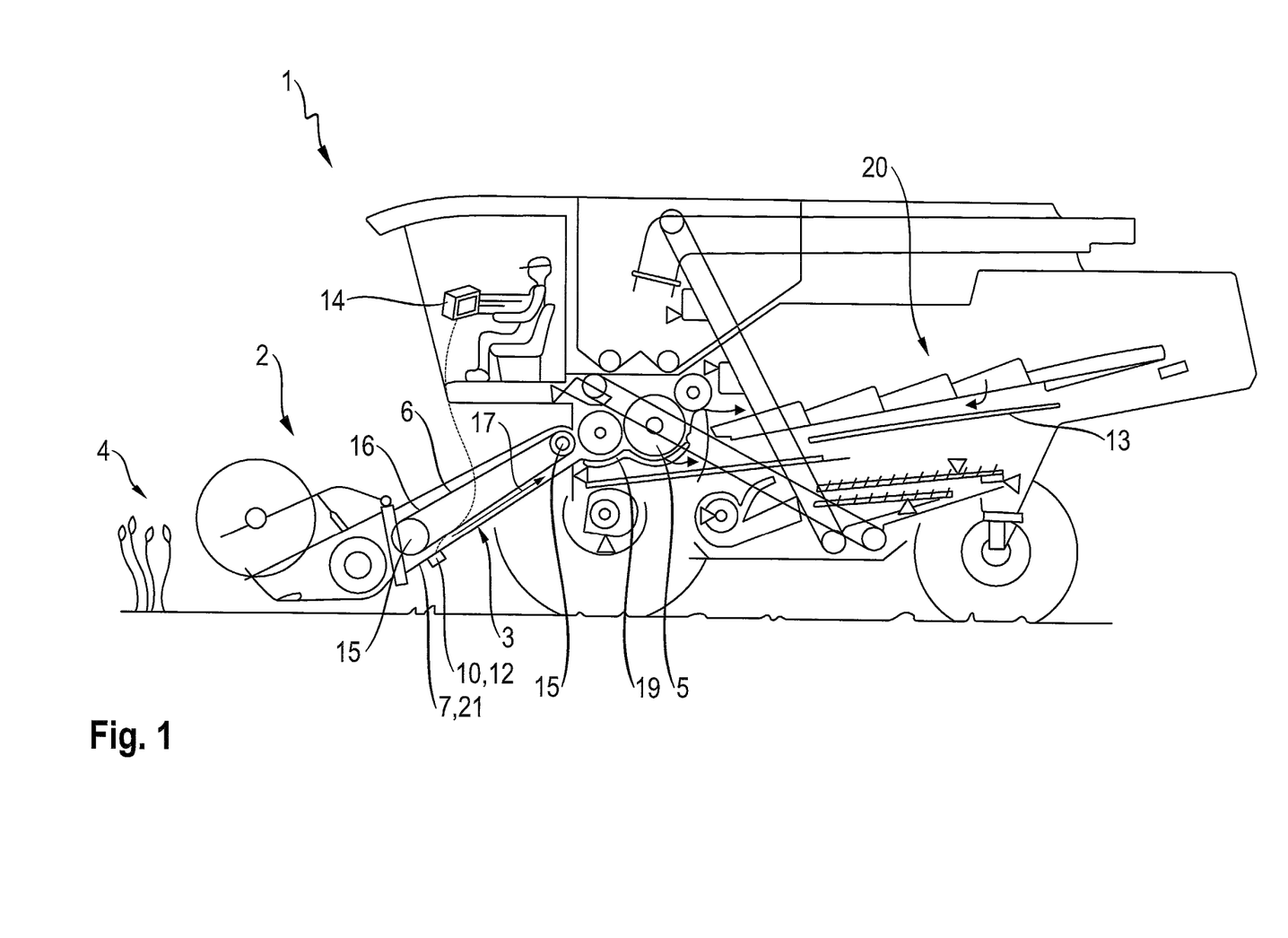
FIG. 1 shows a schematic cross-section of a combine harvester according to the invention.

Moreover, the piece of information regarding the transverse distribution can be utilized particularly well for affecting working elements downstream from the feeder 3, for example, the threshing mechanism 5 as well as the separation mechanism 20, in such a way that at least one operating parameter of at least one of the working elements is changed. It is understood, in this case, that this change is intended, in particular, to improve handling of the plants 4 transversely distributed individually within the conveyor channel 8, and so a preferably high portion of the removed fruits is separated from plant residue. In this way, the combine harvester 1 according to the invention is operated particularly efficiently.

LIST OF REFERENCE CHARACTERS

1 harvesting machine
2 header
3 feeder
4 plants
5 threshing mechanism
6 conveying unit
7 channel wall
8 conveyor channel
9 material feed height
10 sensor unit
11 width of the conveyor channel
12 sensor element
13 return pan
14 evaluation unit
15 roller
16 endless belt
17 feed direction
18 conveyor slat
19 threshing concave
20 separation mechanism
21 channel base
22 side wall

What is claimed is:

1. A combine harvester comprising:
   at least one header configured for cutting plants to be harvested with the aid of the combine harvester;
   at least one feeder configured for conveying the cut plants in a direction of a threshing mechanism, the feeder comprising at least one revolvingly driveable conveying unit which, together with at least one channel wall of the feeder, delimits a conveyor channel, and the conveying unit being configured for conveying the cut plants through the conveyor channel;
   at least one threshing mechanism configured for removing fruits from the cut plants so that the fruits are then present separately from plant residue of the plants;
   a measuring unit configured for contactlessly detecting within the conveyor channel a material feed height of plants conveyed with the aid of the feeder, the measuring unit comprising at least one sensor unit comprising multiple sensor elements distributed across a width of the conveyor channel; and
   at least one evaluation unit which is connected to the sensor unit, the evaluation unit being configured to evaluate information from the individual sensor elements in such a way to obtain at least approximately one piece of information regarding a transverse distribution of the cut plants within the conveyor channel across an entire width of the conveyor channel;
   wherein each one of the multiple sensor elements comprises an elongated sensor strip having a longitudinal axis that extends transversely to a feed direction of the feeder, and
   wherein the multiple sensor elements are situated outside the conveyor channel, below a channel wall designed as a channel base.

2. The combine harvester as claimed in claim 1, wherein the multiple sensor elements comprise at least four sensor elements that are equidistantly arranged across a width of the conveyor channel.

3. The combine harvester as claimed in claim 1, wherein the conveying unit comprises at least two oppositely positioned rollers and at least one endless belt wrapped around the rollers, wherein at least one of the rollers is designed to be rotatably driveable.

4. The combine harvester as claimed in claim 3, wherein the conveying unit comprises a plurality of conveyor slats extending transversely to a feed direction.

5. A method for operating a combine harvester, comprising the following steps:
   a) cutting plants to be harvested with the aid of a header,
   b) conveying the cut plants with a feeder having a conveyor channel in a direction of a threshing mechanism,
   c) contactlessly detecting with a measuring unit a material feed height of the plants conveyed through the conveyor channel of the feeder, the measuring unit being designed in the form of a sensor unit comprising multiple sensor elements in the form of sensor strips having a longitudinal axis that extends transversely to a feed direction of the feeder and being distributed across a width of the conveyor channel outside the conveyor channel, below a channel wall designed as a channel base, and
   d) removing fruits from the cut plants with the aid of the threshing mechanism so that the fruits are then present separately from plant residue of the plants, and
   e) evaluating with an evaluation unit information gathered with the multiple sensor elements to generate information regarding a transverse distribution of the cut plants within the conveyor channel at least across an entire width of the conveyor channel.

6. The method as claimed in claim 5, wherein the step of detecting takes place at different measurement points distributed across a width of the conveyor channel.

7. The method as claimed in claim 5 wherein the material feed height is detected exclusively contactlessly.

8. The method as claimed in claim 5, comprising the steps of forwarding the information regarding the transverse distribution to downstream working elements of the combine harvester and changing at least one operating parameter of at least one downstream working element based on the forwarded information.

* * * * *